United States Patent
Ohnishi

(10) Patent No.: US 9,532,008 B2
(45) Date of Patent: Dec. 27, 2016

(54) DISPLAY CONTROL APPARATUS AND DISPLAY CONTROL METHOD

(75) Inventor: Motoo Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/276,923

(22) Filed: Oct. 19, 2011

(65) Prior Publication Data

US 2012/0098854 A1    Apr. 26, 2012

(30) Foreign Application Priority Data

Oct. 21, 2010  (JP) .................... 2010-236414

(51) Int. Cl.
| | | |
|---|---|---|
| G09G 5/00 | (2006.01) | |
| H04N 7/18 | (2006.01) | |
| G03B 21/26 | (2006.01) | |
| H04N 5/232 | (2006.01) | |
| G09G 5/34 | (2006.01) | |

(52) U.S. Cl.
CPC ............. *H04N 7/18* (2013.01); *G03B 21/26* (2013.01); *H04N 5/232* (2013.01); *H04N 5/23238* (2013.01); *G09G 5/34* (2013.01); *G09G 2340/045* (2013.01); *G09G 2358/00* (2013.01)

(58) Field of Classification Search
CPC ...... H04N 5/23206; H04N 7/18; H04N 5/232; H04N 5/23238; H04N 7/181; H04N 5/23203; G06K 9/00771; G06K 2009/366; G06K 9/3233; G06T 7/20; G06T 19/006; G06T 3/00; G06T 2219/028; G06T 19/00; G08B 13/19652; G08B 13/19606; G08B 13/19634; G08B 13/19686; G08B 13/19628; G08B 13/19682; G01S 3/7864; G09G 2340/045; G09G 5/34; G09G 2358/00; G03B 21/26

See application file for complete search history.

(56) References Cited

U.S. PATENT DOCUMENTS

| | | | | |
|---|---|---|---|---|
| 5,479,206 A | * | 12/1995 | Ueno et al. | 348/211.5 |
| 5,642,474 A | * | 6/1997 | Parkhurst et al. | 358/1.18 |
| 5,929,904 A | * | 7/1999 | Uchida | 348/211.7 |
| 6,034,716 A | * | 3/2000 | Whiting et al. | 348/36 |
| 6,266,085 B1 | * | 7/2001 | Kato et al. | 348/211.7 |
| 6,289,165 B1 | * | 9/2001 | Abecassis | 386/224 |

(Continued)

FOREIGN PATENT DOCUMENTS

| | | |
|---|---|---|
| CN | 1574891 A | 2/2005 |
| CN | 101803384 A | 8/2010 |

(Continued)

OTHER PUBLICATIONS

Prihavec, User interface for video observation over the internet, 1998.*

(Continued)

*Primary Examiner* — Devona Faulk
*Assistant Examiner* — Charles L Beard
(74) *Attorney, Agent, or Firm* — Canon U.S.A. Inc., IP Division

(57) ABSTRACT

A display control apparatus includes a control unit of a client configured to specify a privacy mask zone in a panoramic area, display a graphic pattern larger than the specified privacy mask zone over the privacy mask zone, and accept an operation to shift the privacy mask zone corresponding to the displayed graphic pattern.

11 Claims, 13 Drawing Sheets

(56) References Cited

U.S. PATENT DOCUMENTS

| | | | |
|---|---|---|---|
| 6,380,972 B1* | 4/2002 | Suga et al. | 348/211.99 |
| 6,434,265 B1* | 8/2002 | Xiong et al. | 382/154 |
| 6,509,926 B1* | 1/2003 | Mills et al. | 348/143 |
| 6,529,234 B2* | 3/2003 | Urisaka et al. | 348/211.99 |
| 6,549,651 B2* | 4/2003 | Xiong et al. | 382/154 |
| 6,597,393 B2* | 7/2003 | Kato et al. | 348/211.99 |
| 6,727,940 B1* | 4/2004 | Oka et al. | 348/211.3 |
| 6,744,461 B1* | 6/2004 | Wada et al. | 348/143 |
| 6,769,131 B1* | 7/2004 | Tanaka | H04N 7/181 348/E7.086 |
| 6,888,565 B1* | 5/2005 | Tanaka et al. | 348/207.11 |
| 6,970,181 B1* | 11/2005 | Fadel | 348/14.01 |
| 6,977,672 B1* | 12/2005 | Okuno | 348/207.11 |
| 6,985,178 B1* | 1/2006 | Morita et al. | 348/211.3 |
| 7,136,096 B1* | 11/2006 | Yamagishi et al. | 348/218.1 |
| 7,149,549 B1* | 12/2006 | Ortiz | H04N 5/232 348/211.2 |
| 7,161,615 B2* | 1/2007 | Pretzer et al. | 348/143 |
| 7,161,623 B2* | 1/2007 | Kuno | 348/211.3 |
| 7,215,827 B2* | 5/2007 | Ito et al. | 382/283 |
| 7,218,342 B2* | 5/2007 | Kobayashi et al. | 348/211.8 |
| 7,321,453 B2* | 1/2008 | Murata et al. | 358/479 |
| 7,366,359 B1* | 4/2008 | Davey et al. | 382/274 |
| 7,391,929 B2* | 6/2008 | Edwards et al. | 382/283 |
| 7,412,112 B2* | 8/2008 | Yamasaki | 382/284 |
| 7,423,667 B2* | 9/2008 | Hayasaka | 348/143 |
| 7,428,314 B2* | 9/2008 | Henson | 382/103 |
| 7,450,840 B2* | 11/2008 | Ohnishi et al. | 396/429 |
| 7,493,038 B2* | 2/2009 | Kang et al. | 396/380 |
| 7,532,238 B2* | 5/2009 | Tanaka et al. | 348/211.8 |
| 7,583,414 B2* | 9/2009 | Kawai | 358/450 |
| 7,697,025 B2* | 4/2010 | Hasegawa et al. | 348/143 |
| 7,742,656 B2* | 6/2010 | Lee | 382/283 |
| 7,751,652 B2* | 7/2010 | Tighe | 382/298 |
| 7,840,090 B2* | 11/2010 | Asai | 382/276 |
| 7,844,301 B2* | 11/2010 | Lee et al. | 455/566 |
| 7,864,198 B2* | 1/2011 | Moroto et al. | 345/629 |
| 7,907,180 B2* | 3/2011 | Takayama | 348/211.8 |
| 8,098,282 B2* | 1/2012 | Gopinath et al. | 348/143 |
| 8,139,083 B2* | 3/2012 | de Leon | 345/619 |
| 8,194,127 B2* | 6/2012 | Kang et al. | 348/143 |
| 8,209,632 B2* | 6/2012 | Reid et al. | 715/833 |
| 8,212,872 B2* | 7/2012 | Sablak | 348/143 |
| 8,223,214 B2* | 7/2012 | Toguchi | 348/211.9 |
| 8,352,856 B2* | 1/2013 | Fillion et al. | 715/243 |
| 8,472,652 B2* | 6/2013 | Suzuki | 382/103 |
| 8,488,001 B2* | 7/2013 | Mohanty et al. | 348/159 |
| 8,514,281 B2* | 8/2013 | Kogane et al. | 348/143 |
| 8,610,787 B2* | 12/2013 | Namba et al. | 348/222.1 |
| 8,659,619 B2* | 2/2014 | Cannon et al. | 345/619 |
| 8,692,904 B2* | 4/2014 | Maruyama | 348/223.1 |
| 8,721,197 B2* | 5/2014 | Miyahara et al. | 396/427 |
| 9,319,635 B2* | 4/2016 | Huang | H04N 7/18 |
| 2001/0019355 A1* | 9/2001 | Koyanagi et al. | 348/36 |
| 2001/0024233 A1* | 9/2001 | Urisaka et al. | 348/213 |
| 2002/0008758 A1* | 1/2002 | Broemmelsiek et al. | 348/143 |
| 2002/0067412 A1* | 6/2002 | Kawai et al. | 348/211 |
| 2003/0025803 A1* | 2/2003 | Nakamura | H04N 7/147 348/218.1 |
| 2003/0026588 A1* | 2/2003 | Elder et al. | 386/46 |
| 2003/0137589 A1* | 7/2003 | Miyata | 348/211.7 |
| 2003/0160868 A1* | 8/2003 | Kakou | G08B 13/19602 348/143 |
| 2003/0174253 A1* | 9/2003 | Ito et al. | 348/699 |
| 2003/0227555 A1* | 12/2003 | Kobayashi et al. | 348/231.6 |
| 2004/0002984 A1* | 1/2004 | Hasegawa | G06T 3/40 |
| 2004/0027453 A1* | 2/2004 | Hasegawa | G08B 13/19667 348/143 |
| 2004/0100477 A1* | 5/2004 | Morita et al. | 345/626 |
| 2005/0030581 A1* | 2/2005 | Hagita | H04N 5/232 358/1.15 |
| 2005/0068437 A1* | 3/2005 | Hayasaka | 348/294 |
| 2005/0134719 A1* | 6/2005 | Beck | 348/333.11 |
| 2005/0157173 A1* | 7/2005 | Kurebayashi et al. | 348/207.11 |
| 2005/0270371 A1* | 12/2005 | Sablak | G06T 3/00 348/143 |
| 2005/0270372 A1* | 12/2005 | Henninger, III | G08B 13/19667 348/143 |
| 2005/0275723 A1* | 12/2005 | Sablak | H04N 7/183 348/169 |
| 2005/0280707 A1* | 12/2005 | Sablak et al. | 348/155 |
| 2006/0008157 A1* | 1/2006 | Hagita | 382/232 |
| 2006/0008175 A1* | 1/2006 | Tanaka et al. | 382/276 |
| 2006/0028548 A1* | 2/2006 | Salivar et al. | 348/143 |
| 2006/0028558 A1* | 2/2006 | Sato | H04N 1/00281 348/211.99 |
| 2006/0045381 A1* | 3/2006 | Matsuo et al. | 382/276 |
| 2006/0139484 A1* | 6/2006 | Seo | H04N 5/232 348/373 |
| 2006/0158527 A1* | 7/2006 | Kang | H04N 5/232 348/211.99 |
| 2006/0187237 A1* | 8/2006 | Park | 345/625 |
| 2006/0192853 A1* | 8/2006 | Lee | 348/143 |
| 2006/0203098 A1* | 9/2006 | Henninger et al. | 348/211.99 |
| 2006/0206911 A1* | 9/2006 | Kim | G08B 13/19686 725/12 |
| 2006/0238617 A1* | 10/2006 | Tamir | G08B 13/19606 348/143 |
| 2006/0266942 A1* | 11/2006 | Ikeda | H04N 5/23238 250/334 |
| 2007/0074129 A1* | 3/2007 | Baumann | 715/764 |
| 2007/0097460 A1* | 5/2007 | Kawai | 358/500 |
| 2007/0115351 A1* | 5/2007 | McCormack | 348/36 |
| 2007/0115356 A1* | 5/2007 | Kang et al. | 348/143 |
| 2007/0116328 A1* | 5/2007 | Sablak | G06K 9/00362 382/103 |
| 2007/0235648 A1* | 10/2007 | Teich | G08B 13/19641 250/330 |
| 2008/0034329 A1* | 2/2008 | Posner et al. | 715/856 |
| 2008/0036877 A1* | 2/2008 | Arima | 348/231.8 |
| 2008/0055409 A1* | 3/2008 | Mars et al. | 348/143 |
| 2008/0104027 A1* | 5/2008 | Imler et al. | 707/3 |
| 2008/0143820 A1* | 6/2008 | Peterson | 348/36 |
| 2008/0180459 A1* | 7/2008 | Jung | H04N 1/0084 345/647 |
| 2008/0180538 A1* | 7/2008 | Jung et al. | 348/222.1 |
| 2008/0204560 A1* | 8/2008 | Nilsson | 348/187 |
| 2008/0211903 A1* | 9/2008 | Davey et al. | 348/39 |
| 2009/0015670 A1* | 1/2009 | Gopinath et al. | 348/143 |
| 2009/0040238 A1* | 2/2009 | Ito et al. | 345/660 |
| 2009/0046147 A1* | 2/2009 | Henson | G08B 13/19604 348/143 |
| 2009/0128632 A1* | 5/2009 | Goto et al. | 348/169 |
| 2009/0131177 A1* | 5/2009 | Pearce | 463/43 |
| 2009/0189980 A1* | 7/2009 | Kim | 348/143 |
| 2009/0207269 A1* | 8/2009 | Yoda | 348/222.1 |
| 2009/0208062 A1* | 8/2009 | Sorek | H04N 5/232 382/107 |
| 2009/0244364 A1* | 10/2009 | Nonogaki | 348/438.1 |
| 2009/0315996 A1* | 12/2009 | Guler et al. | 348/169 |
| 2010/0002082 A1* | 1/2010 | Buehler et al. | 348/159 |
| 2010/0021069 A1* | 1/2010 | Fan et al. | 382/224 |
| 2010/0134591 A1* | 6/2010 | Park et al. | 348/36 |
| 2010/0149330 A1* | 6/2010 | Salgar et al. | 348/143 |
| 2010/0182447 A1* | 7/2010 | Namba | G02B 7/28 348/222.1 |
| 2010/0325589 A1* | 12/2010 | Ofek | G01C 21/367 715/854 |
| 2010/0328460 A1* | 12/2010 | Merkel et al. | 348/143 |
| 2011/0004888 A1* | 1/2011 | Srinivasan et al. | 719/329 |
| 2011/0026901 A1* | 2/2011 | Kashima | 386/282 |
| 2011/0074978 A1* | 3/2011 | Kogane et al. | 348/240.3 |
| 2011/0119588 A1* | 5/2011 | Siracusano, Jr. | 715/723 |
| 2011/0273473 A1* | 11/2011 | Kim | G06T 19/00 345/629 |
| 2011/0273570 A1* | 11/2011 | Sakaki | H04N 5/23203 348/207.11 |
| 2011/0273579 A1* | 11/2011 | Sakaki | H04N 7/183 348/222.1 |
| 2012/0026165 A1* | 2/2012 | Morifuji | H04N 5/23238 345/419 |

(56) References Cited

U.S. PATENT DOCUMENTS

| | | | | |
|---|---|---|---|---|
| 2012/0026344 A1* | 2/2012 | Ezoe | | H04N 7/181 348/207.1 |
| 2012/0056977 A1* | 3/2012 | Ohnishi | | G06T 3/0043 348/36 |
| 2012/0096126 A1* | 4/2012 | Kamei et al. | | 709/219 |
| 2012/0098965 A1* | 4/2012 | Barcala | | G08B 13/19686 348/143 |
| 2012/0169842 A1* | 7/2012 | Chuang | | G08B 13/19619 348/39 |
| 2012/0194636 A1* | 8/2012 | Tokunaga | | H04N 1/3876 348/36 |
| 2012/0242788 A1* | 9/2012 | Chuang | | G08B 13/19602 348/36 |
| 2013/0021433 A1* | 1/2013 | Belsarkar | | H04N 7/181 348/36 |
| 2013/0070092 A1* | 3/2013 | Miyahara | | H04N 5/232 348/143 |
| 2013/0342712 A1* | 12/2013 | Kozakura | | H04N 5/23222 348/207.11 |
| 2014/0152815 A1* | 6/2014 | Huang | | H04N 21/4542 348/143 |
| 2014/0160282 A1* | 6/2014 | Yamagi | | H04N 7/18 348/143 |
| 2014/0301665 A1* | 10/2014 | Saito | | G06F 19/321 382/299 |
| 2015/0172554 A1* | 6/2015 | Adachi | | H04N 5/23296 348/36 |

FOREIGN PATENT DOCUMENTS

| | | |
|---|---|---|
| EP | 713331 A1 | 5/1996 |
| JP | 2001-069494 A | 3/2001 |
| JP | 2001-136514 A | 5/2001 |
| JP | 2002-027466 A | 1/2002 |
| JP | 2005-294912 A | 10/2005 |
| JP | 2006-222721 A | 8/2006 |
| JP | 2006-304122 A | 11/2006 |
| JP | 2007-129336 A | 5/2007 |
| JP | 2007-328457 A | 12/2007 |

OTHER PUBLICATIONS

Dual View Photo Editing in Photoshop, http://www.photoshopessentials.com/photo-editing/dual-view/, Jul. 2009.*
Tomoaki, JP 2001136514, 2001.*

* cited by examiner

FIG. 5

| MANAGEMENT NUMBER | PAN | TILT | ZOOM | LEFT | TOP | WIDTH | HEIGHT |
|---|---|---|---|---|---|---|---|
| 1 | 100 | 40 | 30 | 120 | 90 | 400 | 300 |
| 2 | 50 | 30 | 40 | 100 | 100 | 300 | 300 |
| 3 | -50 | 0 | 20 | 0 | 0 | 640 | 480 |

DISPLAY CONTROL APPARATUS AND DISPLAY CONTROL METHOD

BACKGROUND OF THE INVENTION

Field of the Invention

The present invention relates to a method of setting a privacy mask.

Description of the Related Art

Methods of setting a privacy mask zone on a captured image have been known. For example, Japanese Patent Application Laid-Open No. 2001-069494 discusses a method of setting a privacy mask zone on a captured image using a display screen. Japanese Patent Application Laid-Open No. 2001-136514 discusses another method of setting a privacy mask zone on a panoramic image that can be captured based on pan/tilt control of a camera.

Depending on the position or size of a privacy mask zone, however, sometimes the privacy mask zone cannot be set easily through intuition. For example, in a case where a privacy mask zone is small, and the privacy mask zone is dragged with a mouse on a panoramic area to change the position or size of the privacy mask zone, a precise setting through the mouse operation is difficult.

In addition, when a privacy mask zone is dragged within a range where an image can be captured at a particular zoom value corresponding to a maximum field of view of an imaging apparatus, depending on the zoom value at the dragging, the privacy mask zone cannot be dragged to an end of the range. In this case also, an intuitive setting of a privacy mask zone cannot be easily performed by a user.

SUMMARY OF THE INVENTION

The present invention is directed a method for easier intuitive setting of a privacy mask zone.

According to an aspect of the present invention, a display control apparatus for displaying an image based on image data obtained from an imaging apparatus, includes a specification unit configured to specify a privacy mask zone of the image, a display control unit configured to control display of a graphic pattern larger than the specified privacy mask zone over the privacy mask zone, and a control unit configured to accept a shift operation of the privacy mask zone corresponding to the displayed graphic pattern.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates setting parameters of mask zones stored in the client 3.

DESCRIPTION OF THE EMBODIMENTS

Various exemplary embodiments, features, and aspects of the invention will be described in detail below with reference to the drawings.

In a first exemplary embodiment, an example where a graphic pattern larger than a privacy mask zone (hereinafter, referred to as mask zone) is displayed on the mask zone is described. In the present exemplary embodiment, a case where a graphic pattern is displayed as a frame surrounding a mask zone is mainly described.

Figure 6:
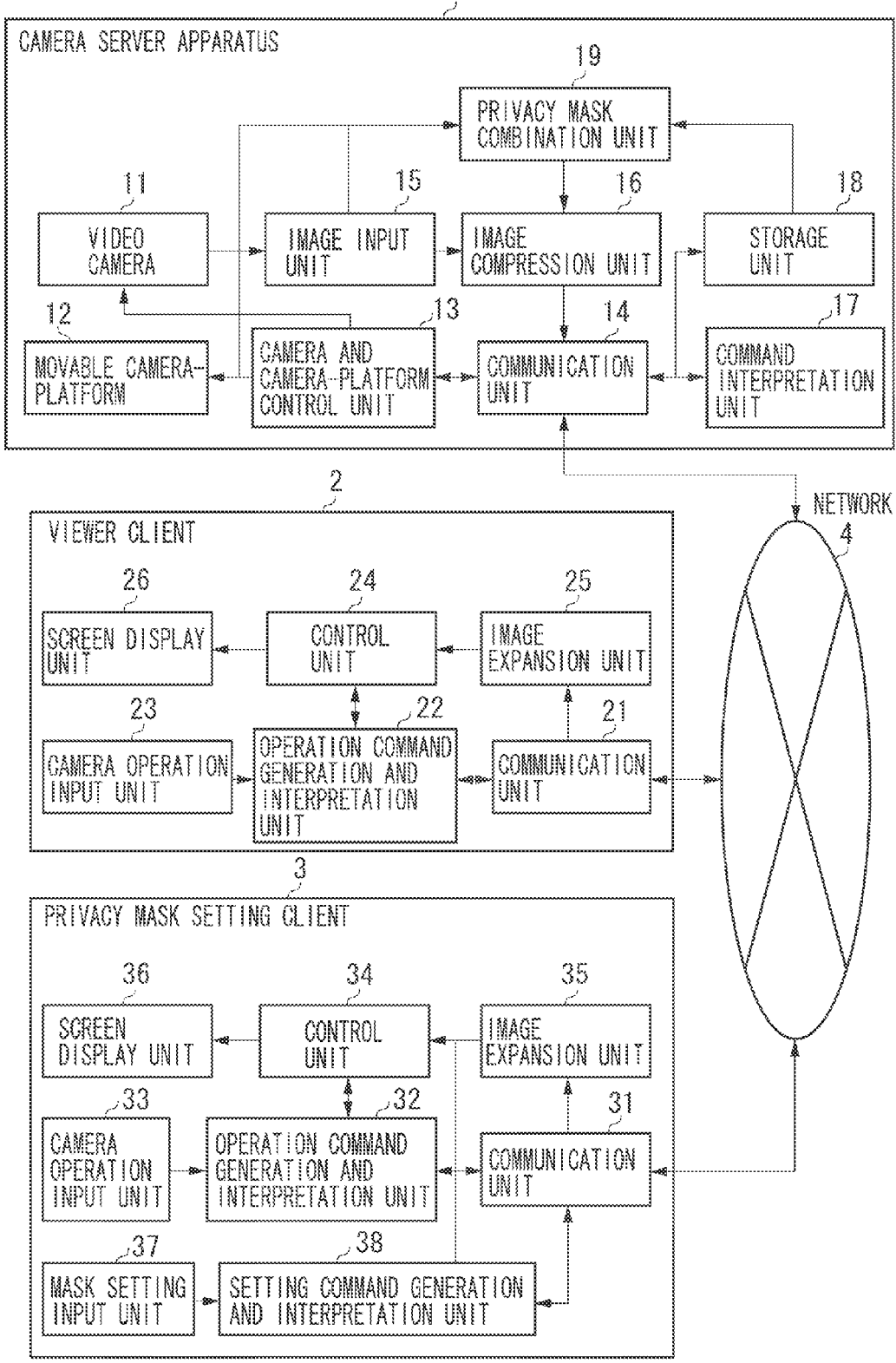
FIG. 6 is a block diagram illustrating a system configuration according to an exemplary embodiment.

The graphic pattern may be colored or colorless inside. The graphic pattern may be a frame defined by a solid line, a dashed line, or a broken line. FIG. 6 is a block diagram illustrating a network camera system using a user interface to set privacy masks according to the present exemplary embodiment.

In the present exemplary embodiment, a camera server 1, a viewer client 2 (hereinafter, referred to as client 2), and a privacy mask setting client 3 (hereinafter, referred to as client 3) are connected to one another through a network 4. There is no limit in the number of apparatuses connected to the network 4, but for ease of description, only one server 1, one client 2, and one client 3 are connected to the network 4 in the present exemplary embodiment.

The network 4 is a digital network such as the Internet or an intranet that has a sufficient bandwidth for camera control signals and image signals. In the present exemplary embodiment, Transmission Control Protocol/Internet Protocol (TCP/IP)) or User Datagram Protocol (UDP/IP)) is used as a network protocol. The camera server 1, the client 2, and the client 3 have different IP addresses respectively assigned thereto.

The client 3 in the present exemplary embodiment sets a mask zone using a privacy mask setting tool which is described below. The camera server 1 performs a privacy mask process on an image captured by a video camera 11 based on the settings of a mask zone from the client 3.

The camera server 1 includes an image input unit 15 that accepts images (moving and still images) captured by the video camera 11. The image input unit 15 inputs the captured images to a privacy mask combination unit 19 when a privacy mask is valid, and to an image compression unit 16 when no privacy mask is valid.

The privacy mask combination unit 19 performs a privacy mask process on the captured image input from the image input unit 15, and inputs the captured image to the image compression unit 16 after the process is completed.

The image compression unit 16 compresses the captured image input from the privacy mask combination unit 19 or the image input unit 15 into a data size that is easy to distribute to clients. The image compression unit 16 receives National Television System Committee (NTSC) signals from the video camera 11. The signals are subjected to A/D conversion and compression into Motion-JEPG format, to be transmitted to a communication unit 14, and then to the network 4.

In the present exemplary embodiment, images are compressed into the Motion JEPG format, but may be compressed into any other format. The communication unit 14 transmits the image data compressed by the image compression unit 16 to the clients 2 and 3 through the network 4.

A storage unit 18 stores settings of a privacy mask transmitted from the client 3 and panoramic image data captured a plurality of times by the video camera 11.

A command interpretation unit 17 interprets camera operation commands received from the clients 2 and 3 through the communication unit 14. The command interpretation unit 17 interprets mask setting commands received from the client 3 through the communication unit 14. The command interpretation unit 17 controls a camera-platform 12 using a camera and camera-platform control unit 13 when receiving a camera operation command with respect to a pan/tilt operation.

The video camera 11 is mounted on the movable camera-platform 12 so that a pan angle and a tilt angle of the video camera 11 are controlled by controlling the camera-platform 12. The command interpretation unit 17, when receiving a camera operation command regarding zooming, controls zooming of the video camera 11 using the camera and camera-platform control unit 13.

The command interpretation unit 17, when receiving a mask setting command regarding addition, shift, or deletion of a privacy mask, rewrites setting parameters of the privacy mask stored in the storage unit 18 to control the privacy mask combination unit 19.

The client 2 specifies an IP address of the camera server 1 to be connected to the camera server 1. A communication unit 21 receives image data and panoramic image data from the camera server 1, and also results of various camera operations. A control unit 24 displays the image corresponding to the image data and panoramic image corresponding to the panoramic image data expanded by an image expansion unit 25, on a screen display unit 26 with a graphical user interface (GUI).

A camera operation input unit 23 accepts various inputs from a user through a mouse and a key board. An operation command generation and interpretation unit 22 generates a camera operation command in response to an input from the camera operation input unit 23, and transmits the command through the communication unit 21 to the camera server 1. For example, when the GUI is operated to control the panning, tilting, and zooming of the video camera 11, the operation command generation and interpretation unit 22 generates various camera operation commands in response to the GUI operations respectively.

The generated various camera operation commands are transmitted from the communication unit 21 to the camera server 1. The operation command generation and interpretation unit 22 interprets the camera operation results received from the camera server 1, and transmits the interpretation to the control unit 24. The control unit 24 then displays the camera operation results received from the operation command generation and interpretation unit 22 on the screen display unit 26.

The client 3, similar to the client 2, specifies an IP address of the camera server 1 to be connected to the camera server 1. The client 3 includes a communication unit 31, an operation command generation and interpretation unit 32, a camera operation input unit 33, an image expansion unit 35, and a screen display unit 36, each unit having the same function as the corresponding unit included in client 2. The client 3 is a display control apparatus that displays images based on image data obtained from an imaging apparatus (i.e., the video camera 11).

A mask setting input unit 37 accepts inputs with respect to settings of a mask zone from user. A setting command generation and interpretation unit 38 generates mask setting commands in response to the inputs from the mask setting input unit 37 respectively.

The communication unit 31 transmits the camera operation commands generated by the operation command generation and interpretation unit 32 as well as the mask setting commands generated by the setting command generation and interpretation unit 38, and receives the corresponding results.

The control unit 34 displays the inputs for setting a mask zone from user through the mask setting input unit 37 and the results of the mask zone setting received from the communication unit 31 on a screen display unit 36.

Figure 1:
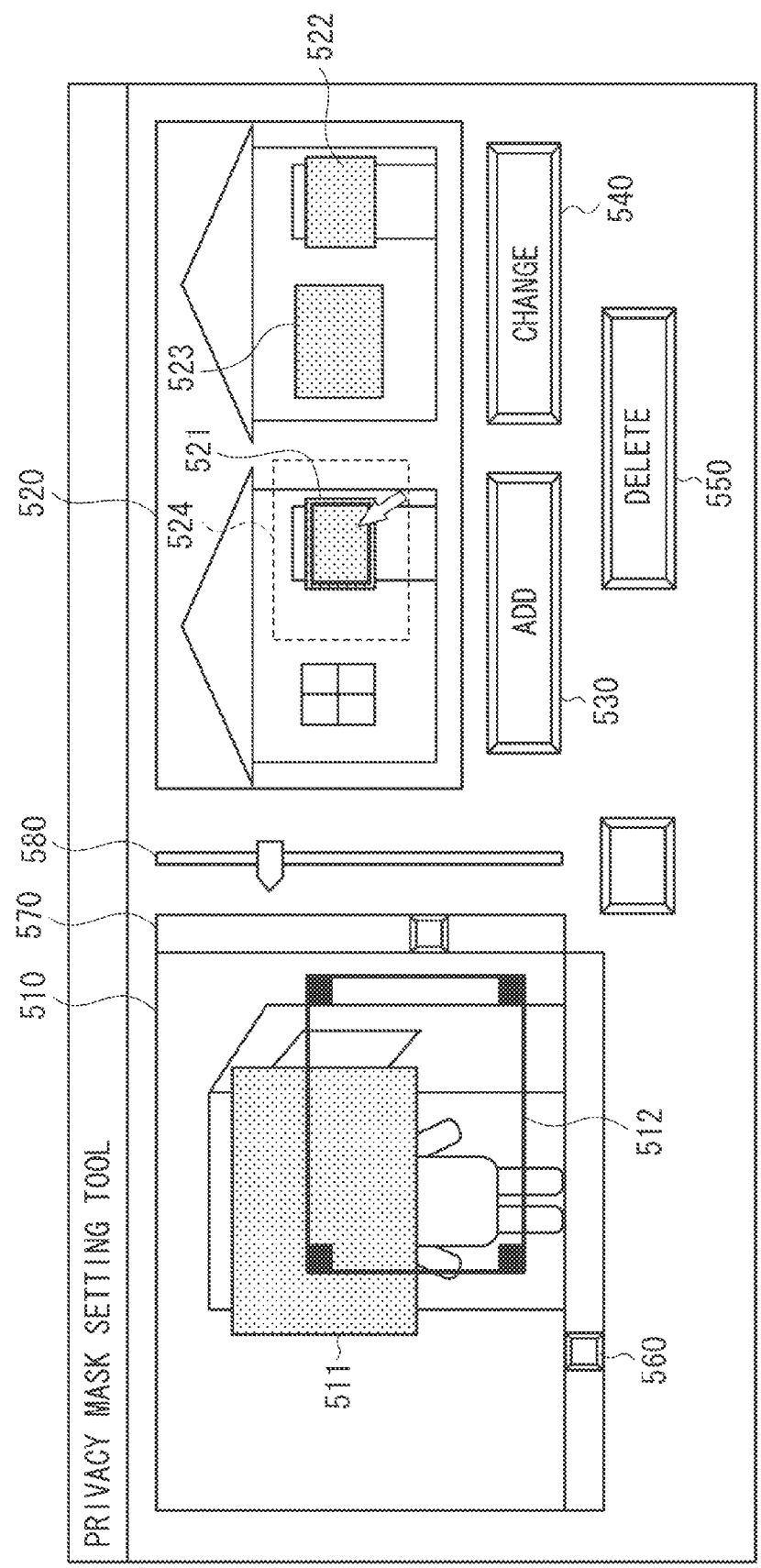
FIG. 1 illustrates an example screen of a client 3.

FIG. 1 illustrates an example display generated by a screen display unit 36 of the client 3.

The display contains an image display area 510 to display an image corresponding to image data transmitted from the camera server 1. A pan scroll bar 560, a tilt scroll bar 570, and a zoom slider 580 are tools to control the movable camera-platform 12 and the zooming of the video camera 11. In the image display area 510, an image combined with a mask zone 511 set by the client 3, and a preview box 512 to set the position and size of a privacy mask are displayed.

The display further contains a panoramic area 520, on its right side, to displays a panoramic image. The panoramic image is a combination of a plurality of images captured by the video camera 11 at a plurality of times by controlling pan angles and tilt angles.

The panoramic area 520 does not necessarily need to display a panoramic image, and is at least required to function as an interface to shift a mask zone within a range where the video camera 11 can capture images.

The panoramic area 520 in the present exemplary embodiment corresponds to an area the video camera 11 can capture images when the video camera 11 is set to a minimum zoom value (wide-angle end). The client 3 in the present exemplary embodiment stores therein the information necessary to set the position of a mask zone within the panoramic area 520 (e.g., information of pan angles and tilt angles that the video camera 11 can take).

In the panoramic image, a plurality of mask zones 521, 522, and 523 at different positions and of different sizes are displayed, and a graphic pattern 524 is displayed over the mask zone 521.

Below the panoramic area 520, an add button 530 to add a new mask zone, a change button 540 to change the position or size of a displayed mask zone, and a delete button 550 to delete a displayed mask zone are displayed.

Click of the add button 530 adds a new mask zone at the position of the preview box 512 in the image display area 510, and also adds a new mask zone at the corresponding position in the panoramic area 520.

Click of the change button 540 changes the position of the selected mask zone 511 to that in the preview box 512, and also changes the corresponding position in the panoramic area 520 according to the change.

Click of the delete button 550 deletes the mask zone 511 from the image display area 510 and from the panoramic area 520.

The setting command generation and interpretation unit 38 generates a mask setting command based on the setting information input from the mask setting input unit 37 in response to the click of the add button 530, the change button 540, or the delete button 550, and transmits the command to the camera server 1. The camera server 1 adds, changes, or deletes the mask zone according to the mask setting command.

FIG. 5 illustrates example setting parameters of mask zones stored in the client 3.

The client 3 in the present exemplary embodiment assigns a management number to each mask zone, and has parameters about the pan angle, tilt angle, and zoom value of each mask zone, and also the left, top, width, and height pixel values that indicate the position and size of the mask zone when the mask zone is set. The left pixel value represents the number of pixels from the left end of an image captured by the video camera 11 at the corresponding pan angle, tilt angle, and zoom value. The height pixel value represents the number of pixels from the top end of an image captured by the video camera 11 at the corresponding pan angle, tilt angle, and zoom value.

The mask setting input unit 37 adds the preview box 512 displayed at the point of time, as a new mask zone, when a user presses the add button 530. In other words, the mask setting input unit 37 sets the pan angle, the tilt angle, the zoom value, and the left, upper, width, and height pixel values of the new additional mask zone, in response to the press-down of the add button 530. The left, upper, width, and height pixel values are converted into pixel values of an image in a video graphics array (VGA) size.

The height of the panoramic area 520 is determined by the visible range in the tilt direction of the video camera 11 with the zoom set at the wide-angle end of the range, and the width of the panoramic area 520 is determined by the visible range in the pan direction with the zoom set at the wide-angle end of the range. The mask zones 521, 522, and 523 displayed in the panoramic area 520 each have a central position determined based on the pan angle, tilt angle, zoom value, and left, and top pixel values of the mask zone.

For example, the graphic pattern 524 has a central position determined by the pan and tilt angles of the corresponding mask zone 521, and a width and a height determined respectively by the zoom value of the video camera 11 that is used to display the graphic pattern 524 and the zoom value corresponding to a maximum field of view (wide-angle end) of the video camera 11.

The client 3 in the present exemplary embodiment can shift a mask zone by selecting and dragging a mask zone in the panoramic area 520, but does not change the panoramic area 520 despite any change in a zoom value.

In the present exemplary embodiment, the range where a mask zone can be shifted corresponds to the range where the video camera 11 can capture images, and therefore, depending on a zoom value during shift of a mask zone, the mask zone cannot be shifted to an end of the panoramic area 520.

More specifically, while the zoom value is not the minimum (at the wide-angle end), a mask zone cannot be shifted to an end of the panoramic area 520. Even if the zoom value is not the minimum, sometimes a mask zone cannot be shifted to an end of the panoramic area 520.

For example, when a mask zone lies on the left side of the image display area 510, the mask zone cannot be shifted to the right side end of the panoramic area through a drag operation on the panoramic area 520.

This happens for the reason described below. The client 3 in the present exemplary embodiment changes the parameters for pan and tilt angles, among the parameters for the mask zone listed in FIG. 5, in response to the drag operation to shift the mask zone. If the mask zone is set to lie on the left side of the image display area 510, the operation to shift the mask zone to the right end of the panoramic area causes the pan angle of the video camera 11 to exceed its limit value.

Thus, the client 3 in the present exemplary embodiment displays a graphic pattern indicating the range where a mask zone can be shifted. The graphic pattern allows the user to easily recognize the range where the mask zone can be shifted, facilitating intuitive settings of a privacy mask zone by the user.

Figure 2A:
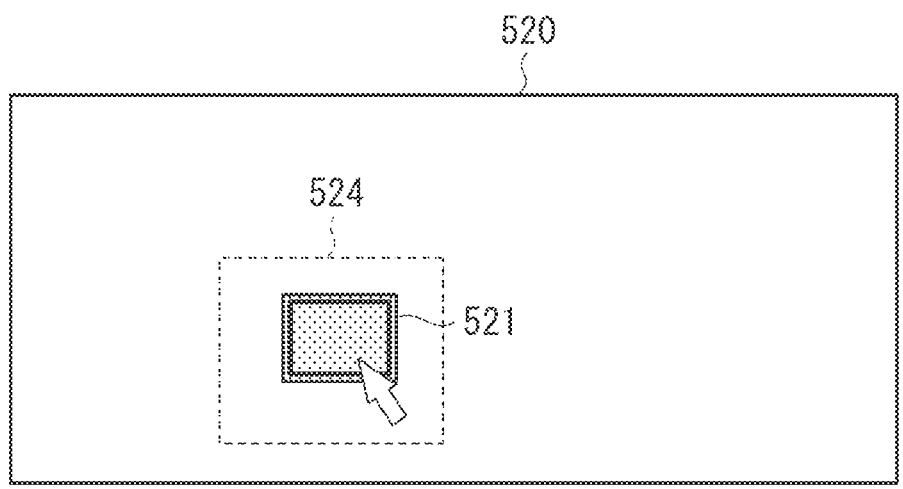
FIG. 2A illustrates an example privacy mask zone and a graphic pattern.

FIG. 2A illustrates the mask zone 521 and the graphic pattern 524 in the panoramic area 520 in FIG. 1. In FIG. 2A, the mask zone 521 can be shifted through a drag operation by the user using a mouse.

Figure 2B:
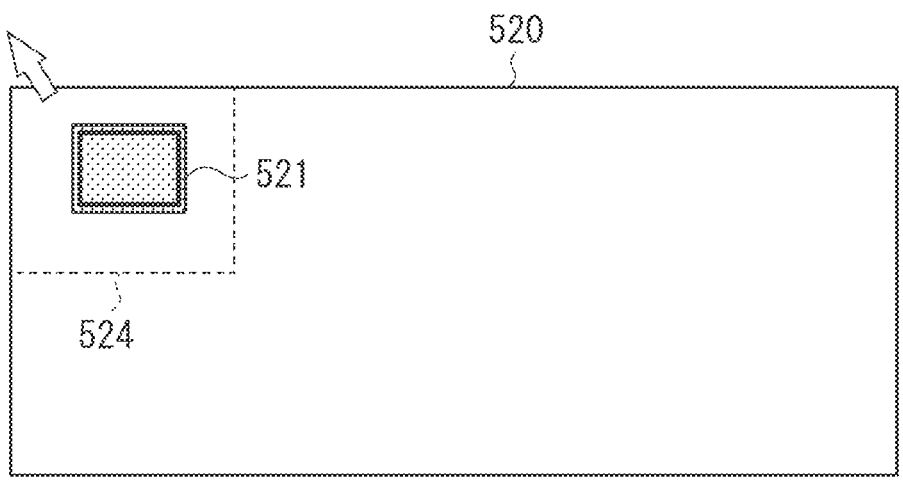
FIG. 2B illustrates a graphic pattern 524 at an end of a panoramic area 520.

As illustrated in FIG. 2B, when the graphic pattern 524 displayed over the mask zone 521 reaches an end of the panoramic area 520, the mask zone 521 cannot be shifted beyond the end through a drag operation. In this way, the display of the graphic pattern 524 clearly indicates the range where the mask zone 521 can be shifted to the user compared with the case where the graphic pattern 524 is not displayed.

Figure 7:
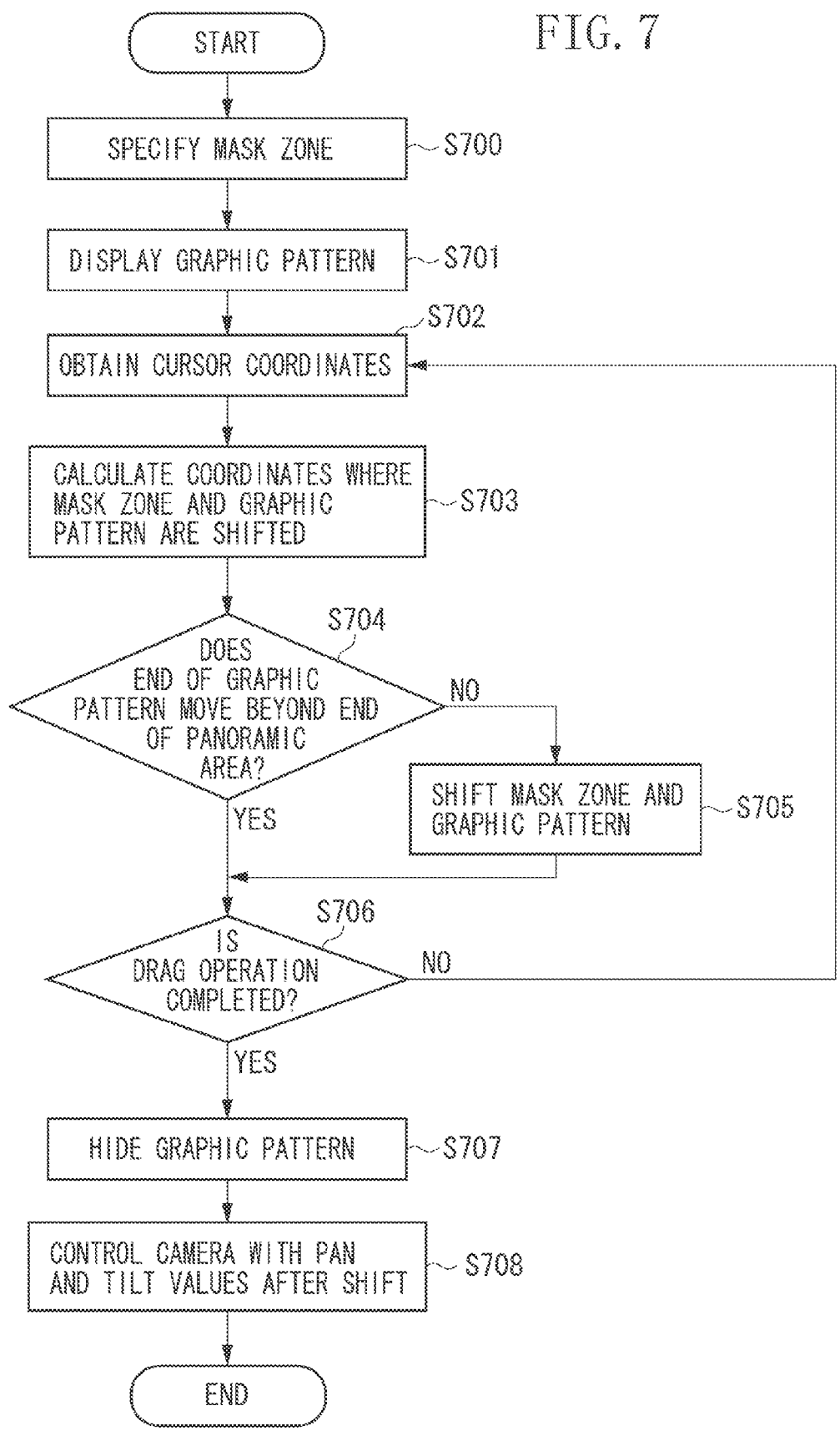
FIG. 7 is a flowchart illustrating a process performed when a privacy mask zone is dragged.

FIG. 7 is a flowchart illustrating a process performed by the client 3 when the mask zone 521 in the present exemplary embodiment is dragged on the panoramic area 520. The client 3 is a display control apparatus that displays images based on image data obtained by the video camera 11 (imaging apparatus).

The process illustrated in FIG. 7 is implemented by a central processing unit (CPU) of the client 3 when the CPU reads and executes a program for the present exemplary embodiment stored in a read only memory (ROM) of the client 3. The process of the flowchart in FIG. 7 may be, however, at least partially configured to be implemented by a dedicated hardware.

In step S700, the mask setting input unit 37 specifies a mask zone after a drag (shift) operation in the panoramic area 520. In the present exemplary embodiment, in step S700 (specification step), the mask zone 521 is dragged on the panoramic area 520 larger than the area (i.e., the image display area 510) where an image captured at one time by the video camera 11 is displayed, and the mask zone 521 is specified. The panoramic area 520 in the present exemplary embodiment displays a panoramic image, but the display of a panoramic image is not essential.

In step S701, the control unit 34 displays the graphic pattern 524 in response to the drag (shift) operation of the mask zone 521 on the panoramic area 520. In other words, the control unit 34, in step S701 (display control step), displays the graphic pattern 524 larger than the specified mask zone over the mask zone 521. The graphic pattern 524 may be colored or colorless. The graphic pattern 524 may be a frame defined by a solid line, a dashed line, or a broken line.

The graphic pattern 524 has a size that is determined according to a zoom value used at the specification of the mask zone 521 (step S700). More specifically, the graphic pattern 524 has a size and a shape determined according to a zoom value when the mask zone 521 is specified in such a manner that, even when the graphic pattern 524 is shifted within the panoramic area, the mask zone does not extend beyond the range where the video camera 11 can capture images at the zoom value used at the specification of the mask zone 521.

A higher zoom value results in a larger graphic pattern 524 relative to the mask zone 521. In step S701, the control unit 34 displays a graphic pattern over a mask zone 521, the graphic pattern having a size determined according to the zoom value of the video camera 11 when the mask zone 521 is specified in the panoramic area 520 (step S700).

The size of the graphic pattern 524 differs depending on the size of the mask zone 521. In other words, when the zoom value is same, an increase in the size of the mask zone 521 results in an increase of the size of the graphic pattern 524. Accordingly, the control unit 34 displays a ratio between the zoom value of the video camera 11 used at the specification of the mask zone 521 (step S700) and a minimum zoom value (i.e., the zoom value for the wide-angle end) of the video camera 11, and the graphic pattern 524 having a size determined according to the size (width and height pixel values) of the mask zone 521.

The display of the graphic pattern 524 may be set through a click for selection of the mask zone 521 or a placement of a mouse cursor on the mask zone 521, as well as the above described drag operation. Alternatively, it is possible to set a mask zone closest to a mouse cursor on a screen to be automatically displayed, among a plurality of mask zones.

In step S702, the control unit 34 obtains the coordinates of the mouse cursor, and in step S703, calculates the positions of the mask zone 521 and the graphic pattern 524 based on the cursor coordinates after the shift operation.

The positional relationship between the mask zone 521 and the graphic pattern 524 is maintained after the drag operation. In step S704, the control unit 34 determines whether the calculation result performed in step S703 indicates that an end of the shifted graphic pattern 524 extends beyond an end of the panoramic area 520.

When the control unit 34 determines an end of the shifted graphic pattern 524 extends beyond an end of the panoramic area 520 (YES in step S704), the process proceeds to step S706 without the mask zone 521 and the graphic pattern 524 being shifted. On the other hand, when the control unit 34 determines an end of the shifted graphic pattern 524 does not extend beyond an end of the panoramic area 520 (NO in step S704), the process proceeds to step S705. In step S705, the mask zone 521 and the graphic pattern 524 are shifted based on the position calculated in step S703.

In step S705 (control step), the control unit 34 accepts a shift operation of the mask zone 521 corresponding to the graphic pattern 524 displayed thereover. The control unit 34 shifts the mask zone 521 within the range where the graphic pattern 524 displayed over the mask zone 521 reaches an end of the panoramic area 520.

In step S706, the control unit 34 determines whether the drag operation is completed or not. When the control unit 34 determines that the drag operation is not completed (NO in step S706), the process returns to step S702. On the other hand, when the control unit 34 determines that the drag operation is completed (YES in step S706), in step S707, the control unit 34 does not display the graphic pattern 524.

In step S708, the setting command generation and interpretation unit 38 transmits a camera control command to control the pan and tilt angles of the video camera 11 to the direction the mask zone 521 is shifted for the amount of shift made through the shift (drag) operation.

The camera and camera-platform control unit 13 of the camera server 1, receiving the camera operation command, controls the movable camera-platform 12 according to the command. More specifically, the setting command generation and interpretation unit 38 controls the direction of the video camera 11 to capture images so that the shifted mask zone 521 is displayed within the image display area 510.

Figure 3:
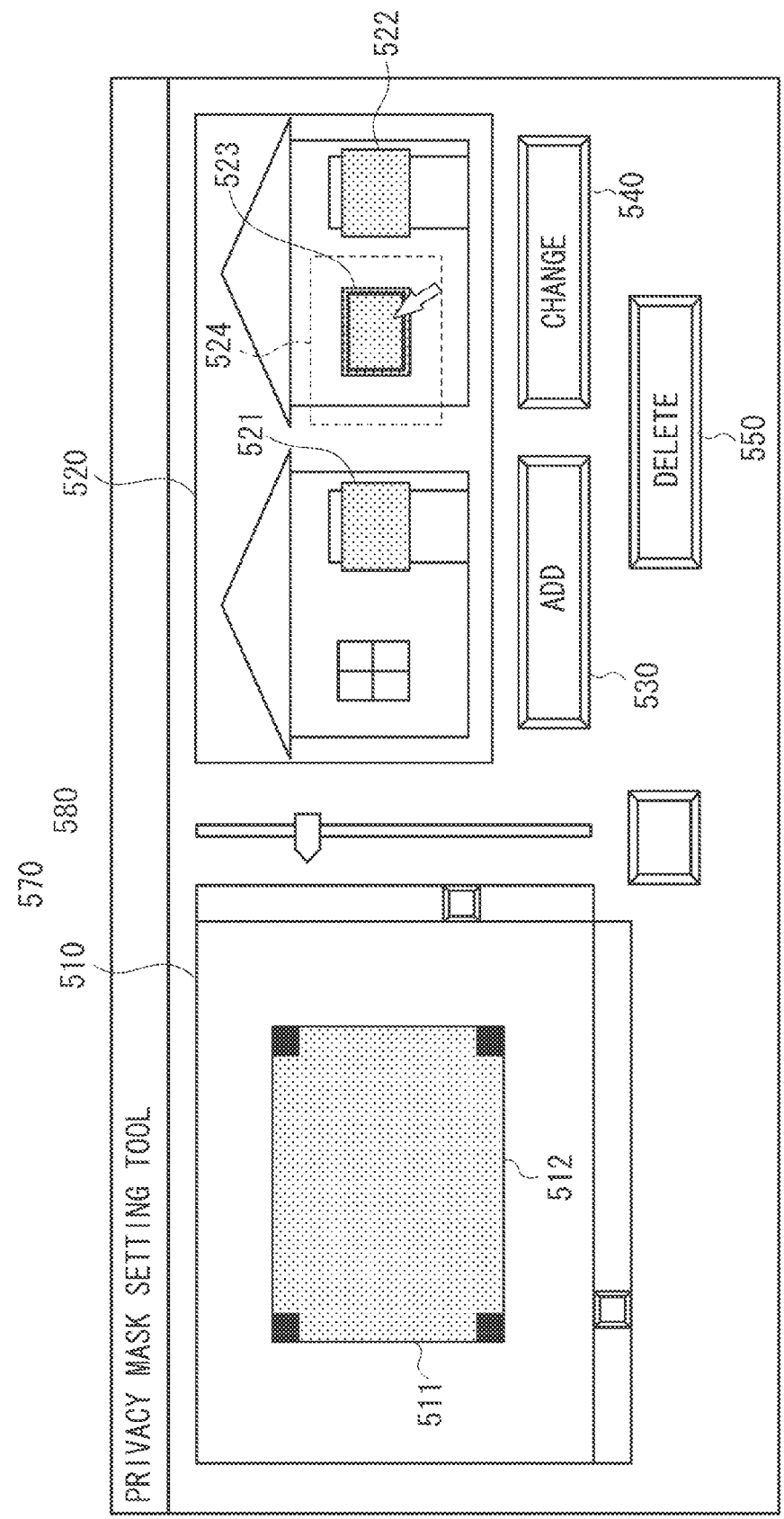
FIG. 3 illustrates an example screen of a client 3 with another selected privacy mask zone.

FIG. 3 illustrates the state where the mask zone 523 is selected through a mouse operation from the state where the mask zone 521 is selected in FIG. 1.

When the mask zone 523 is selected (e.g., through a mouse click) in the state where the mask zone 521 is selected, the graphic pattern displayed over the mask zone 521 is hidden, and the graphic pattern 524 is displayed over the mask zone 523.

At the same time, the video camera 11 is controlled according to the pan, tilt, and zoom values set at the setting of the mask zone 523. As a result, the mask zone 511 corresponding to the mask zone 523 is displayed in the image display area 510, and the preview box 512 is displayed.

The preview box 512 is used to shift the mask zone 523 or to determine the position of a new additional mask zone. More specifically, when the preview box 512 is shifted within the image display area 510 and the change button 540 is pressed, the mask zone 511 is shifted to the position within the preview box 512.

Figure 4:
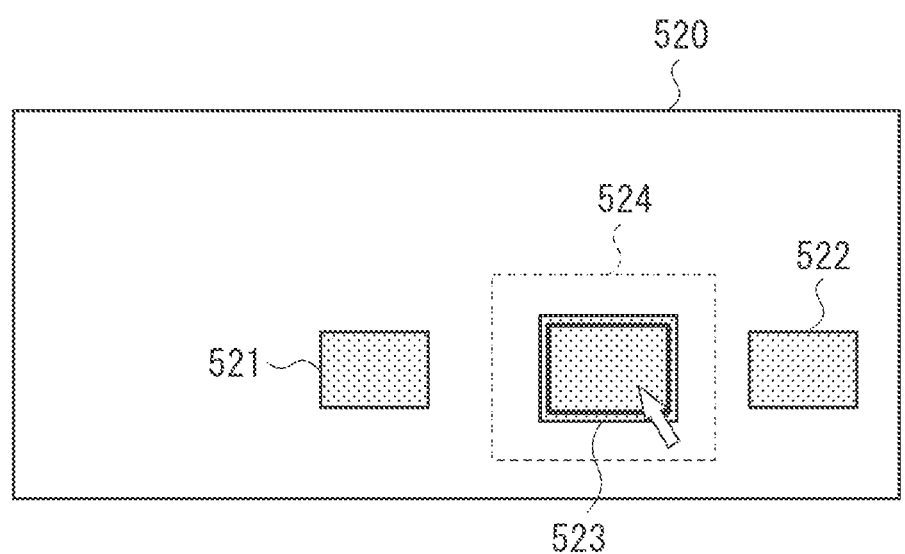
FIG. 4 illustrates an example privacy mask zone and the graphic pattern in the panoramic area in FIG. 3.

FIG. 4 illustrates the mask zones 521 to 523 and the graphic pattern 524 in the panoramic area 520 in FIG. 3.

Figure 8:
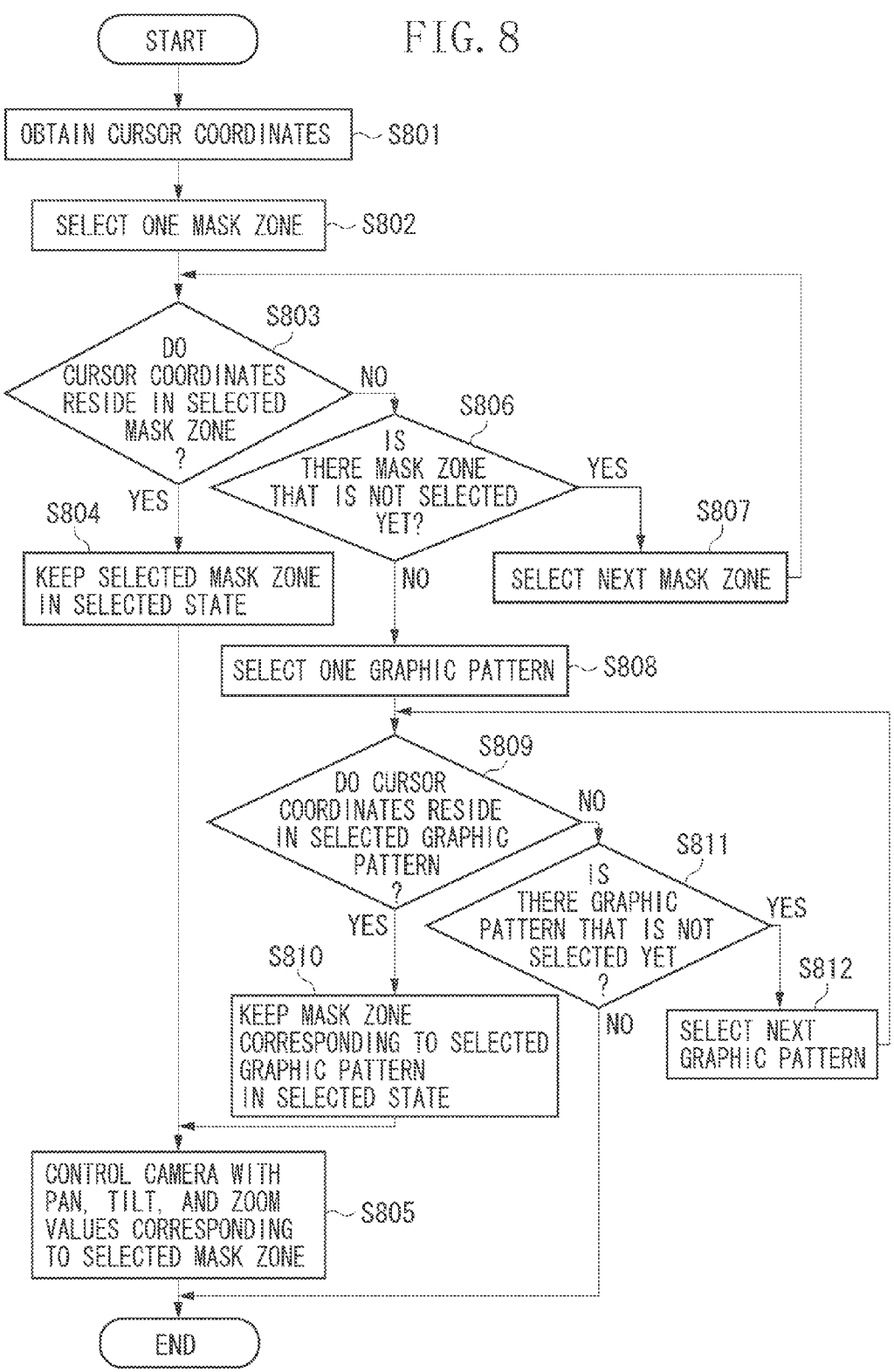
FIG. 8 is a flowchart illustrating a process performed for a click operation within a panoramic area.

FIG. 8 is a flowchart illustrating a process performed by the client 3 for click operations within the panoramic area 520 using a mouse. The process illustrated in FIG. 8 is implemented by the CPU of the client 3 when the CPU reads and executes a program for the present exemplary embodiment stored in the ROM of the client 3. The process of the flowchart in FIG. 8 may be, however, at least partially configured to be implemented by a dedicated hardware.

In step S801, when a position within the panoramic area 520 is clicked, the control unit 34 obtains the coordinate of the mouse cursor from the mask setting input unit 37. In step S802, the control unit 34 selects one mask zone, and obtains information of the corresponding area.

In step S803, the control unit 34 determines whether the cursor coordinates obtained in step S801 reside in the area obtained in step S802. When the control unit 34 determines that the cursor coordinates reside in the selected mask zone (YES in step S803), the process proceeds to step S804. When the control unit 34 determines the cursor coordinates do not reside in the selected mask zone (NO in step S803), the process proceeds to step S806. In step S804, the control unit 34 keeps the selected mask zone in a selected state, and the process proceeds to step S805.

In step S806, the control unit 34 determines whether there is a mask zone that is not selected yet. When the control unit 34 determines that there is an unselected mask zone (YES in step S806), in step S807, the control unit 34 selects the unselected mask zone and obtains information of the corresponding area, and the process returns to step S803. When the control unit 34 determines that there is no unselected mask zone (NO in step S806), the process proceeds to step S808.

In step S808, the control unit 34 selects one graphic pattern and obtains information of the corresponding area. In step S809, the control unit 34 determines whether the cursor coordinates obtained in step S801 reside in the area obtained in step S808. When the control unit 34 determines that the cursor coordinates reside in the area (YES in step S809), the process proceeds to step S810. When the control unit 34 determines that the cursor coordinates do not reside in the area (NO in step S809), the process proceeds to step S811. In step S810, the control unit 34 keeps the mask zone corresponding to the selected graphic pattern in a selected state, and the process proceeds to step S805.

In step S811, the control unit 34 determines whether there is a graphic pattern that is not selected yet. When the control unit 34 determines that there is an unselected graphic pattern (YES in step S811), the process proceeds to step S812, and in step S812 the control unit 34 selects the unselected graphic pattern and obtains information of the corresponding area, and the process returns to step S809. When the control unit 34 determines there is no unselected graphic pattern (NO in step S811), the process ends.

In step S805, the setting command generation and interpretation unit 38 controls the video camera 11 based on the pan, tilt, and zoom values set at the setting of the mask zone that is kept in the selected state in step S804 or step S810. In other words, the setting command generation and interpretation unit 38 in the present exemplary embodiment transmits a camera control command to control the pan angle, the tilt angle, and the zoom value corresponding to the mask zone selected through the mouse operation, to the camera server 1. The transmission results in display of the mask zone selected through the mouse operation and the preview box in the image display area 510, allowing user to shift the mask zone and change the size of the mask zone.

In the present exemplary embodiment, when it is determines that the coordinates of the mouse cursor do not reside in a target mask zone, it is then determined whether the coordinates reside in a graphic pattern. When the coordinates reside in the graphic pattern, the mask zone corresponding to the graphic pattern is set to the selected state. In other words, the control unit 34 in the present exemplary embodiment displays the mask zones 521, 522, and 523 set through pressing of the add button 530 in the panoramic area 520.

The mask setting input unit 37 determines a mask zone to be shifted according to a shift operation (i.e., a drag operation using a mouse), among the displayed mask zones, according to a specification of a graphic pattern. In other words, an operation to select a graphic pattern results in the selection of a mask zone corresponding to the graphic pattern.

Such a process facilitates selection of a mask zone even when a mouse operation is difficult to select a mask zone due to its small size. However, steps S808 to S812 in FIG. 8 may not be executed. In addition, the panoramic area 520 in the present exemplary embodiment contains a panoramic image, but the display of a panoramic image is not essential.

Figure 9:
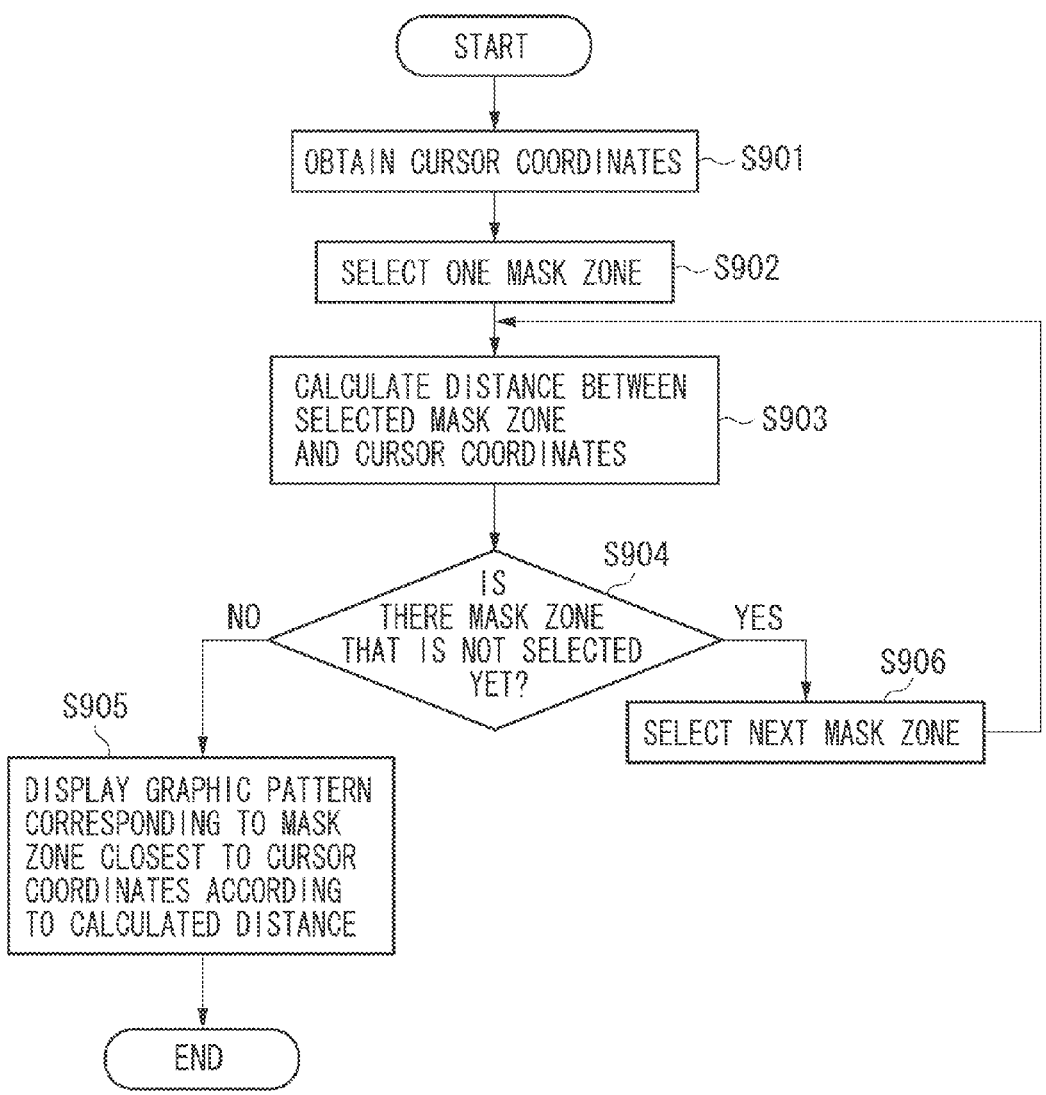
FIG. 9 is a flowchart illustrating a process to display a graphic pattern based on the position of a mouse cursor.

FIG. 9 is a flowchart illustrating a process performed by the client 3 to display a graphic pattern based on the position of a mouse cursor. The process illustrated in FIG. 9 is implemented by the CPU of the client 3 when the CPU reads and executes a program for the present exemplary embodiment stored in the ROM of the client 3. The process of the flowchart in FIG. 9 may be, however, at least partially configured to be implemented by a dedicated hardware.

In step S901, the control unit 34 obtains the coordinates of the mouse cursor from the mask setting input unit 37. In step S902, the control unit 34 selects one mask zone, and obtains the positional information of the area for the mask zone. In step S903, the control unit 34 calculates the distance between the coordinates of the mouse cursor and the mask zone based on the coordinate obtained in step S901 and the positional information of the area obtained in step S902.

The control unit 34 repeats the operations in steps S904 and S906, to calculate the distance between the coordinates of the mouse cursor and each mask zone in the panoramic area 520. In step S905, control unit 34 displays the graphic pattern corresponding to the mask zone closest to the coordinates of the mouse cursor according to the distances obtained in step S901.

For example, in a case where a first mask zone and a second mask zone exist, the control unit 34 displays a graphic pattern over the first mask zone closer to the mouse cursor than the second mask zone. Further, for example, when the mouse cursor is placed on the first mask zone, a graphic pattern is displayed over the first mask zone. Upon a click of a mouse in the state of step S905, the process proceeds to the process illustrated in FIG. 10.

Figure 10:
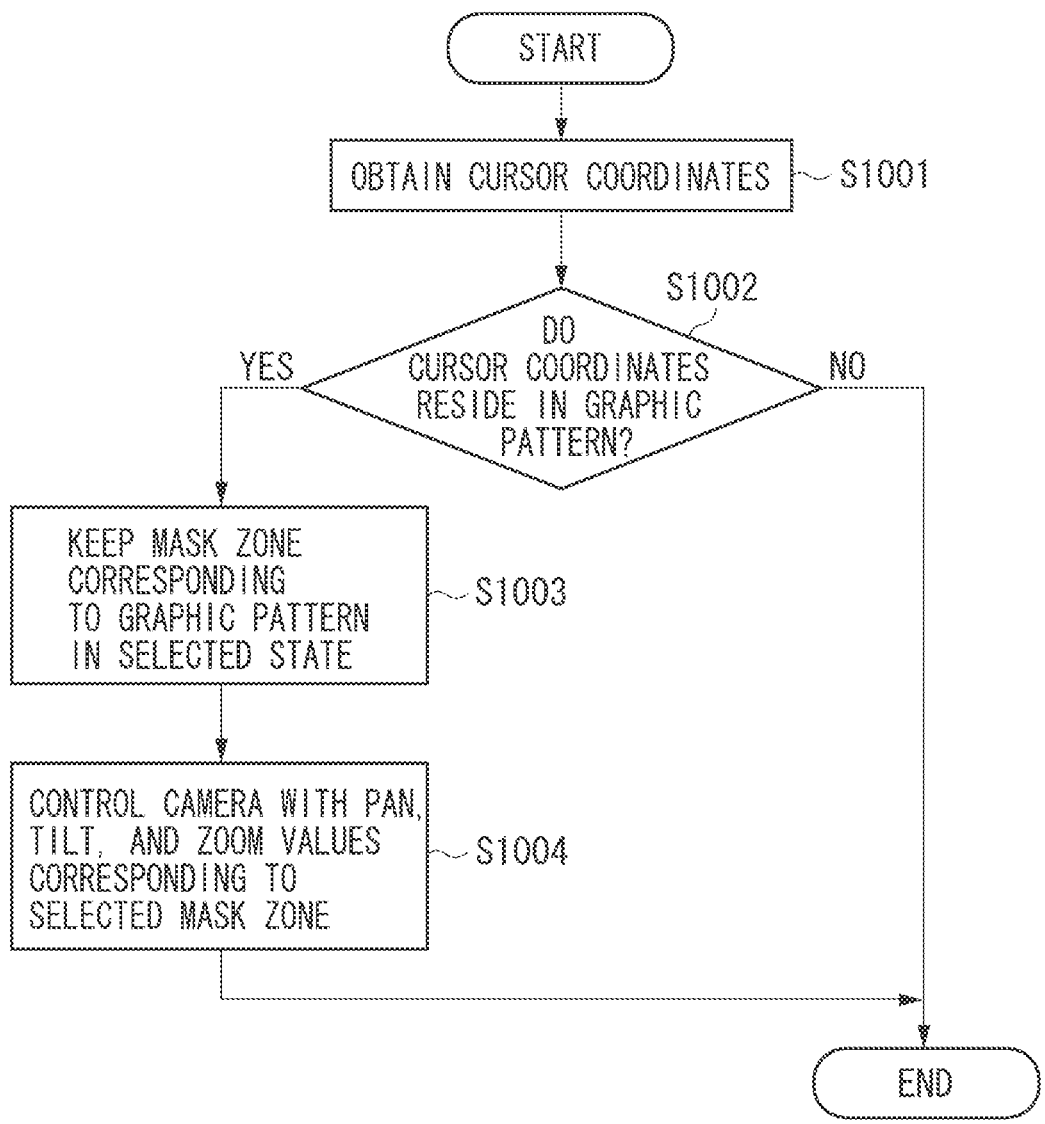
FIG. 10 is a flowchart illustrating a process to select a privacy mask zone according to the selected graphic pattern in FIG. 9.

FIG. 10 is a flowchart illustrating a process performed by the client 3 upon a click of a mouse in the state of step S905 where a graphic pattern is displayed. The process illustrated in FIG. 10 is implemented by the CPU of the client 3 when the CPU reads and executes a program for the present exemplary embodiment stored in the ROM of the client 3. The process of the flowchart in FIG. 9 may be, however, at least partially configured to be implemented by a dedicated hardware.

In step S1001, the control unit 34 obtains the coordinates of the mouse cursor at the click of the mouse. In step S1002, the control unit 34 determines whether the mouse is clicked in the graphic pattern displayed in step S905 based on the coordinates obtained in step S1001. When the control unit 34 determines that the mouse is clicked in the graphic pattern (YES in step S1002), the process proceeds to step S1003. When the control unit 34 determines that the mouse is not clicked in the graphic pattern (NO in step S1002), the process ends.

In step S1003, the control unit 34 brings a mask zone corresponding to the displayed graphic pattern into a selected state. In step S1004, the setting command generation and interpretation unit 38 transmits a camera operation command to control the movable camera-platform 12 and the video camera 11 to the pan angle, the tilt angle, and the zoom value corresponding to the mask zone in the selected state, to the camera server 1, and then, the process ends.

The camera server 1 controls the movable camera-platform 12 and the zooming of the video camera 11 in response to the receipt of the camera operation command in step S1004. Thereby, the mask zone in the selected state in step S1003 and a preview box are displayed in the image display area 510.

As described above, the client 3 in the present exemplary embodiment displays, over the mask zone, a graphic pattern larger than a mask zone specified in the panoramic area 520. The client 3 in the present exemplary embodiment performs control so that the mask zone can be shifted until an end of the graphic pattern reaches an end of the panoramic area 520.

This allows a user to easily recognize the range in which a mask zone can be shifted. In addition, a mask zone corresponding to a graphic pattern can be selected and shifted according to a selection and a drag operation of the graphic pattern, and thereby the selection and shift operation of a mask zone are facilitated even when the mask zone is smaller than the panoramic area 520.

In the first exemplary embodiment, a graphic pattern is displayed to surround a selected mask zone. In a second exemplary embodiment, a graphic pattern is displayed in the panoramic area 520 to indicate the entire range where a mask zone can be shifted. The difference between the present exemplary embodiment and the first exemplary embodiment is mainly described.

Figure 11:
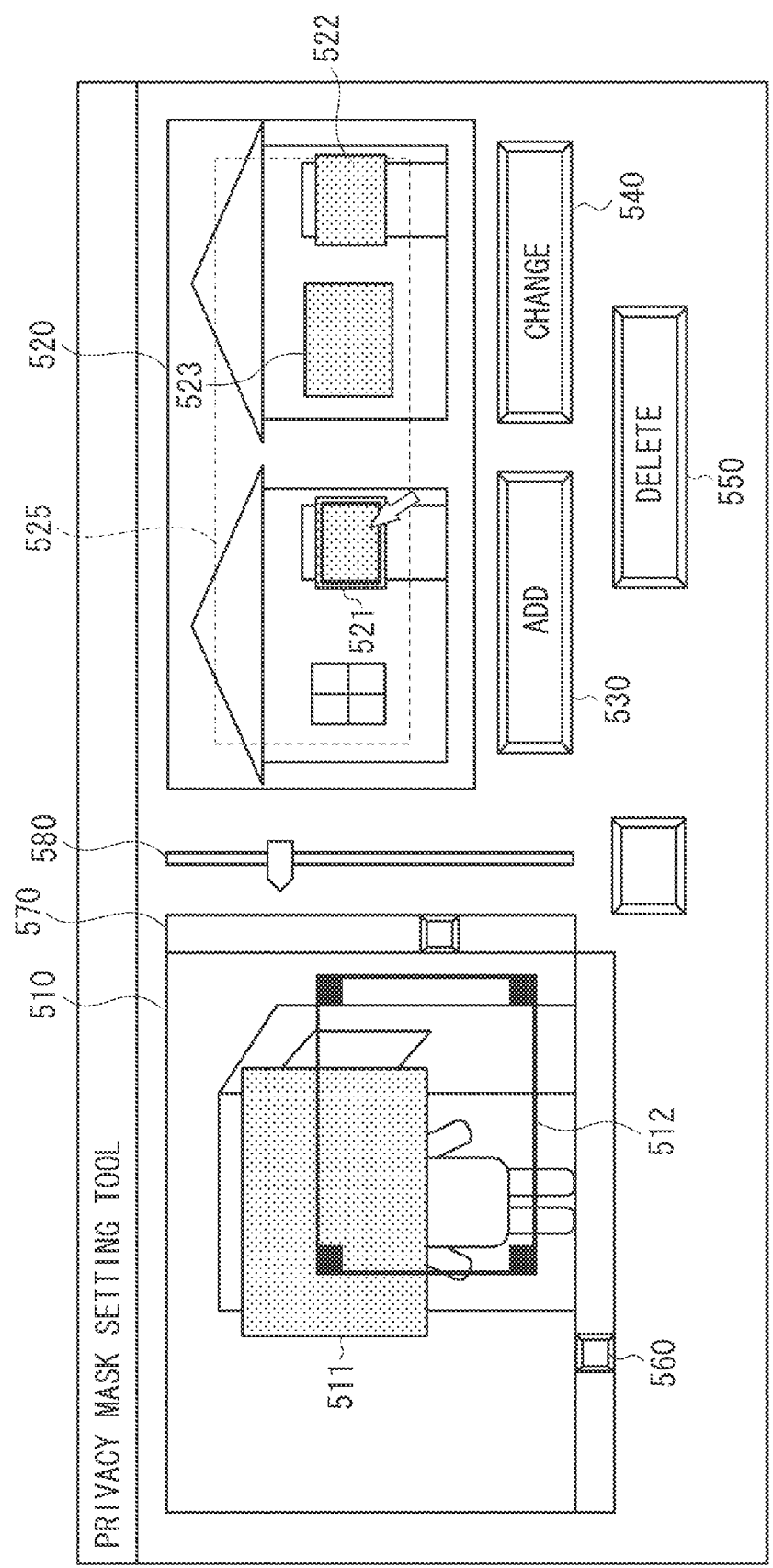
FIG. 11 illustrates an example screen of a client 3 according to a second exemplary embodiment.

FIG. 11 illustrates an example screen display of a screen display unit 36 of the client 3 in the present exemplary embodiment. As illustrated in FIG. 11, a graphic pattern 525 is displayed in the panoramic area 520 of the present exemplary embodiment to indicate a range where a mask zone can be shifted. In the present exemplary embodiment, a panoramic image is displayed in the panoramic area 520, however, the display of a panoramic image in the panoramic area 520 is not essential.

Figure 12:
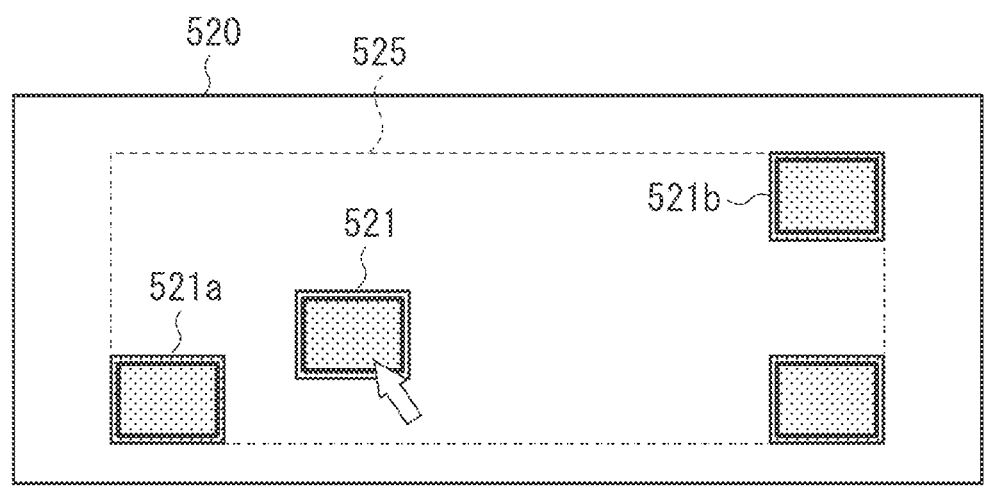
FIG. 12 illustrates an example panoramic area of a client 3 according to the second exemplary embodiment.

The graphic pattern 525 is described in detail with reference to FIG. 12. FIG. 12 illustrates the panoramic area 520 and the mask zone 521 illustrated in FIG. 11. As illustrated in FIG. 12, the mask zone 521 can be shifted within the graphic pattern 525. In this way, the control unit 34 of the present exemplary embodiment displays a graphic pattern (i.e., the graphic pattern 525) indicating the entire range where a mask zone can be shifted.

Figure 13:
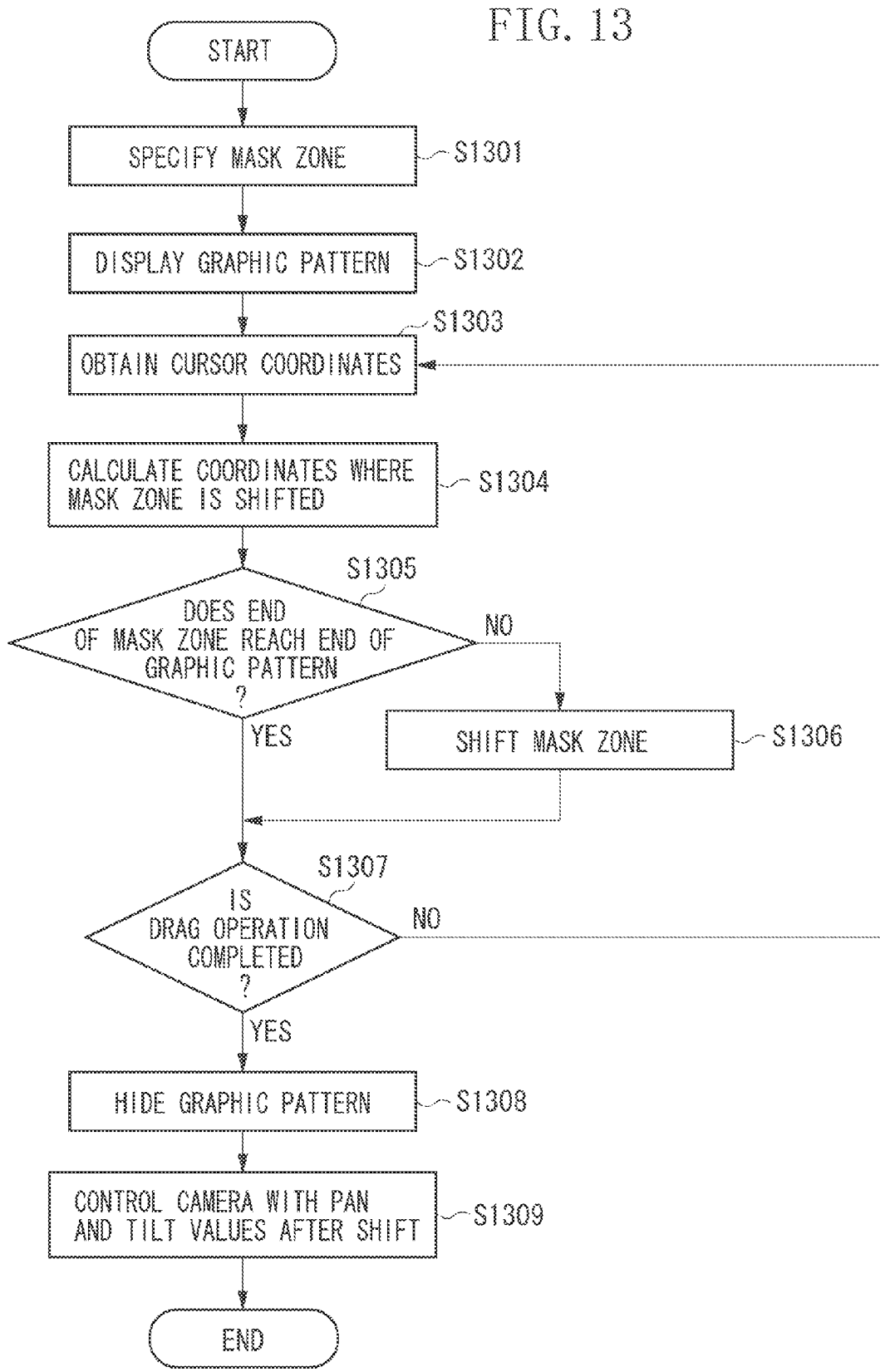
FIG. 13 is a flowchart illustrating a process performed when a drag operation is performed in a panoramic area according to the second exemplary embodiment.

FIG. 13 is a flowchart illustrating a process performed by the client 3 upon a drag operation in the panoramic area 520. The client 3 is a display control apparatus that displays images based on image data obtained from the video camera 11 (i.e., an imaging apparatus).

The process illustrated in FIG. 13 is implemented by the CPU of the client 3 when the CPU reads and executes a program for the present exemplary embodiment stored in the ROM of the client 3. The process of the flowchart in FIG. 8 may be, however, at least partially configured to be implemented by a dedicated hardware.

In step S1301, the mask setting input unit 37 specifies a mask zone through a drag operation in the panoramic area 520. In the present exemplary embodiment, a mask zone 521 is specified according to a drag operation of the mask zone 521.

In step S1302, the control unit 34 causes a graphic pattern 525 to be displayed upon a drag operation of the mask zone 521 in the panoramic area 520. The graphic pattern 525 is not displayed when the video camera 11 has a minimum zoom value (at the wide-angle end) at the shift operation (drag operation). This is because the mask zone can be shifted to an end of the panoramic area 520 when the video camera 11 has the minimum zoom value.

The graphic pattern 525 becomes smaller for a higher zoom value of the video camera at the drag operation. In other words, the control unit 34 displays the graphic pattern 525 having a size in proportion to a ratio between the zoom value of the video camera 11 when the mask zone is specified and the zoom value for the maximum field of view.

In step S1302 (display control step), the control unit 34 displays the graphic pattern 525 indicating a range where the mask zone 521 can be shifted, according to the zoom value of the video camera 11 when the mask zone 521 is specified in step S1301. The graphic pattern 525 may be colored or colorless. The graphic pattern 525 may be a frame defined by a solid line, a dashed line, or a broken line.

In step S1303, the control unit 34 obtains the coordinates of the mouse cursor, and in step S1304, calculates the position of the shifted mask zone 521 based on the obtained cursor coordinate. In step S1305, the control unit 34 determines whether the calculation in step S1303 indicates that an end of the shifted mask zone 521 extends beyond an end of the graphic pattern 525.

When it is determined that an end of the shifted mask zone 521 does not extend beyond an end of the graphic pattern 525 (NO in step S1305), in step S1306, the control unit 34 allows the shift of the mask zone 521. On the other hand, when it is determined that an end of the shifted mask zone 521 extends beyond an end of the graphic pattern 525 (YES in step S1305), the control unit 34 does not allow the shift of the mask zone 521, and the process proceeds to step S1307.

In step S1307, the control unit 34 determines whether the drag operation is completed or not. The control unit 34 determines that the drag operation is completed when detecting release of a mouse button. When the control unit 34 determines that the drag operation is not completed (NO in step S1307), the process returns to step S1303. When the control unit 34 determines that the drag operation is completed (YES in step S1307), the process proceeds to step S1308.

In step S1308, the control unit 34 hides the graphic pattern 525. In step S1309, the setting command generation and interpretation unit 38 transmits a camera operation command to control the pan and tilt angles of the video camera 11 in the shift direction to correspond to the shift amount of the mask zone through the shift operation (drag operation).

The control unit 34 displays the graphic pattern 525 as described below when the panoramic area 520 and mask zones are rectangles. That is, the control unit 34 displays the graphic pattern 525 as a rectangle having a diagonal line between the left lower coordinates of a mask zone 521a at the minimum pan and tilt angles of the video camera 11 and the right upper coordinate of a mask zone 521b at the maximum pan and tilt angles of the video camera 11.

In the present exemplary embodiment, the graphic pattern 525 is displayed during a drag operation of a mask zone, but the graphic pattern 525 may be set to be displayed according to a position of a mouse cursor or at a timing of a mouse click.

Furthermore, in the present exemplary embodiment, specification of a mask zone and an instruction to shift a mask zone are manipulated through a mouse operation, but the present invention is not limited thereto, and various interfaces such as touch panel and joystick may be used.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-236414 filed Oct. 21, 2010, which is hereby incorporated by reference herein in its entirety.

What is claimed is:

1. A display control apparatus comprising:
a memory;
at least one processor configured to,
control displaying, on a display, a panoramic area within which an imaging apparatus can capture an image by changing a capturing area of the imaging apparatus, a capturing area where the imaging apparatus captures an image, and a mask area within a capturing area wherein the capturing area and the mask area are displayed within the panoramic area and the mask area is for masking a part of the image captured by the imaging apparatus;
receive an operation from a client to shift a position of the mask area to be set on the panoramic area;
control a display of shifting of, according to the operation on the panoramic area received by the receiving unit, a position of the capturing area as well as the position of the mask area within the panoramic area on the display so that the mask area cannot be shifted beyond an end of the panoramic area if the capturing area reaches the end of the panoramic area, a relationship about position and size between the capturing area and the mask area being kept on the panoramic area during synchronous shifting;
a setting unit configured to set the mask area at the shifted position; and
the panoramic area is displayed on a first display area of the display and a captured image that is captured by the imaging apparatus of which a capturing direction corresponds to a position of the capturing area on the panoramic area is displayed on a second display area of the display, and the second display area is separated from the first display area, wherein the operation is received to shift a position of a mask area on a captured image displayed on the second display area, and wherein a position of the mask area on the panoramic area changes according to the operation to shift a position of a mask area on a captured image displayed on the second display area.

2. The display control apparatus according to claim 1, wherein the capturing area indicates an area where the imaging apparatus can capture an image at one time by changing a zoom value of the imaging apparatus, and
wherein the mask area is shifted under the condition that the positional relationship of the capturing area and the mask area is kept and that the capturing area does not shift beyond the panoramic area.

3. The display control apparatus according to claim 1, wherein the display control unit controls to display the capturing area starts to be displayed on the panoramic area if a placing operation of a mouse cursor on the mask area is received by the receiving unit.

4. The display control apparatus according to claim 1, wherein the capturing area on the panoramic area starts to be displayed, if a shift operation of the mask area is received by the receiving unit.

5. The display control apparatus according to claim 1, wherein when a first and a second mask area are displayed on the panoramic area, the capturing area including a first mask area positioned closer to a mouse cursor than a second mask area in the panoramic area is displayed, and
wherein the first mask area to is shifted according to the shift operation among the first and the second mask area, if the first mask area is positioned closer to a mouse cursor than the second mask area in the panoramic area.

6. The display control apparatus according to claim 1, a pan angle and a tilt angle of the imaging apparatus is controlled according to the direction where the mask area is shifted on the panoramic area.

7. The display control apparatus according to claim 1, wherein a capturing direction of the imaging apparatus changes corresponding to the shift of the capturing area on the panoramic area.

8. The display control apparatus according to claim 1,
wherein the panoramic area is displayed on a first display area of the display and a captured image that is captured by the imaging apparatus of which a capturing direction corresponds to a position of the capturing area on the panoramic area is displayed on a second display area of the display, and the second display area is separated from the first display area,
wherein the operation is received to shift a position of a mask area on a captured image displayed on the second display area, and
wherein a position of the mask area on the panoramic area changes according to the operation to shift a position of a mask area on a captured image displayed on the second display area.

9. The apparatus according to claim 1, wherein the captured image corresponding to the capturing area of the imaging apparatus near the panoramic area is displayed on the display, a new masked image is added at a position of the captured image as well as at a corresponding position of the mask area within the panoramic area on the display according to an operation to add a new masked image.

10. A display control method performed by a display control apparatus, the method comprising:
displaying, on a display, a panoramic area within which an imaging apparatus can capture an image by changing a capturing area of the imaging apparatus, a capturing area where the imaging apparatus captures an image, and a mask area within a capturing area wherein the capturing area and the mask area are displayed within the panoramic area and the mask area is for masking a part of the image captured by the imaging apparatus;
receiving an operation from a client to shift a position of the mask area to be set on the panoramic area;
shifting of, according to the received operation on the panoramic area so that the mask area cannot be shifted beyond an end of the panoramic area if the capturing area reaches the end of the panoramic area, a position of the capturing area as well as the position of the mask area displayed on the panoramic area, relationship about position and size between the capturing area and the mask area being kept on the panoramic area during synchronous shifting;
setting the mask area at the shifted position and the panoramic area is displayed on a first display area of the display and a captured image that is captured by the imaging apparatus of which a capturing direction corresponds to a position of the capturing area on the panoramic area is displayed on a second display area of the display, and the second display area is separated from the first display area, wherein the operation is received to shift a position of a mask area on a captured image displayed on the second display area, and wherein a position of the mask area on the panoramic area changes according to the operation to shift a position of a mask area on a captured image displayed on the second display area.

11. A non-transitory computer-readable storage medium storing a computer-executable process, the computer-executable process causing a computer that displays an image to execute a method comprising:

displaying, on a display, a panoramic area within which an imaging apparatus can capture an image by changing a capturing area of the imaging apparatus, a capturing area where the imaging apparatus captures an image, and a mask area within a capturing area wherein the capturing area and the mask area are displayed within the panoramic area and the mask area is for masking a part of the image captured by the imaging apparatus;

receiving an operation from a client to shift a position of the mask area to be set on the panoramic area;

shifting of, according to the received operation on the panoramic area so that the mask area cannot be shifted beyond an end of the panoramic area if the capturing area reaches the end of the panoramic area, a position of the capturing area as well as the position of the mask area displayed on the panoramic area, relationship about position and size between the capturing area and the mask area being kept on the panoramic area during synchronous shifting;

setting the mask area at the shifted position and the panoramic area is displayed on a first display area of the display and a captured image that is captured by the imaging apparatus of which a capturing direction corresponds to a position of the capturing area on the panoramic area is displayed on a second display area of the display, and the second display area is separated from the first display area, wherein the operation is received to shift a position of a mask area on a captured image displayed on the second display area, and wherein a position of the mask area on the panoramic area changes according to the operation to shift a position of a mask area on a captured image displayed on the second display area.

* * * * *